(12) United States Patent
Kariatsumari et al.

(10) Patent No.: US 6,481,690 B2
(45) Date of Patent: Nov. 19, 2002

(54) CAR BODY ENERGY ABSORBER AND BUMPER STAY

(75) Inventors: Koji Kariatsumari, Kobe; Satoshi Nimura, Shimonoseki; Toru Hashimura, Kobe, all of (JP)

(73) Assignee: Kobe Steel, Ltd., Kobe (JP)

( * ) Notice: Subject to any disclaimer, the term of this patent is extended or adjusted under 35 U.S.C. 154(b) by 0 days.

(21) Appl. No.: 09/783,568

(22) Filed: Feb. 15, 2001

(65) Prior Publication Data
US 2001/0024051 A1 Sep. 27, 2001

(30) Foreign Application Priority Data

Feb. 17, 2000 (JP) ......................... 2000-039307
Apr. 11, 2000 (JP) ......................... 2000-109294

(51) Int. Cl.$^7$ ............................... B60R 19/04
(52) U.S. Cl. ................... 253/155; 293/120; 293/102; 296/188
(58) Field of Search ................ 293/155, 121, 293/120, 133; 188/370

(56) References Cited

U.S. PATENT DOCUMENTS

| | | | | |
|---|---|---|---|---|
| 3,938,841 A | * | 2/1976 | Glance et al. ............... 267/116 |
| 4,413,856 A | * | 11/1983 | McMahan et al. .......... 293/110 |
| 4,466,646 A | * | 8/1984 | Delmastro et al. .......... 293/117 |
| 4,482,180 A | * | 11/1984 | Huber et al. ................ 293/120 |
| 4,563,028 A | * | 1/1986 | Ogawa et al. .............. 293/122 |
| 4,762,352 A | * | 8/1988 | Enomoto .................... 293/120 |
| 4,940,270 A | * | 7/1990 | Yamazaki et al. .......... 293/110 |
| 4,996,634 A | * | 2/1991 | Haneda et al. .............. 362/82 |
| 4,996,761 A | | 3/1991 | Bayer et al. |
| 5,124,193 A | * | 6/1992 | Sano et al. .................. 428/220 |
| 5,201,912 A | * | 4/1993 | Terada et al. ............... 293/120 |
| 5,271,650 A | | 12/1993 | Fukuhara et al. |
| 5,290,078 A | * | 3/1994 | Bayer et al. ................ 267/139 |
| 5,290,079 A | * | 3/1994 | Syamal ...................... 264/257 |
| 5,407,239 A | * | 4/1995 | Arai et al. .................. 293/102 |
| 5,441,319 A | * | 8/1995 | Oyama et al. .............. 293/102 |
| 5,540,016 A | * | 7/1996 | Clausen ...................... 296/188 |
| 6,056,840 A | * | 5/2000 | Mills et al. ................. 156/217 |
| 6,059,331 A | * | 5/2000 | Mori .......................... 293/133 |
| 6,209,934 B1 | * | 4/2001 | Sakuma et al. ............. 293/120 |
| 6,325,431 B1 | * | 12/2001 | Ito .............................. 293/102 |

FOREIGN PATENT DOCUMENTS

| | | |
|---|---|---|
| JP | 6-227333 | 8/1994 |
| JP | 6-286536 | 10/1994 |
| JP | 10-129371 | 5/1998 |
| JP | 11-208392 | 8/1999 |
| JP | 11-208393 | 8/1999 |
| WO | WO 00/17017 | 3/2000 |

* cited by examiner

*Primary Examiner*—Kiran Patel
(74) *Attorney, Agent, or Firm*—Oblon, Spivak, McClelland, Maier & Neustadt, P.C.

(57) ABSTRACT

A lightweight car body energy absorber made of Al alloy which provides a high energy absorption performance. The car body energy absorber comprises a hollow shape with a rectangular sectional profile and a reinforcing shape attached to the front face of the collision plane of the hollow shape, where the hollow shape and the reinforcing shape are aluminum alloy extruded shapes. The reinforcing shape has a hat-shaped open sectional profile, which is composed of a collision wall almost parallel to the collision plane of the hollow shape, plural mutually parallel horizontal ribs which support the collision wall, and vertical flanges provided at the tips of these ribs. The reinforcing shape is joined to the collision plane of the hollow shape through the vertical flanges.

12 Claims, 9 Drawing Sheets

CAR BODY ENERGY ABSORBER AND BUMPER STAY

BACKGROUND OF THE INVENTION

1. Field of the Invention

This invention relates to energy absorbers as extruded shapes made of aluminum alloy which have a high strength to resist a car body's collision against a pole (aluminum is hereinafter called Al). It is also concerned with bumper stays to be attached to the body side face of the curved end portions of a bumper reinforcement having curved portions at both ends.

2. Description of Related Art

A car body incorporates body energy absorbers such as bumper reinforcements and door beams. The bumper fitted to the front or rear of the body has, in its inside, a bumper reinforcing member called a bumper reinforcement or bumper reinforce.

Recently, for the sake of lightness, there has been an increasing tendency to use extruded shapes of high-strength aluminum alloys (which have the same sectional profile in the longitudinal direction) such as JIS 5000, 6000 and 7000 series instead of steel shapes which were often used formerly.

Al alloys are higher in such energy absorption as mentioned above than steel if they have the same weight. As an Al alloy extruded shape which has the same sectional profile in the longitudinal direction, it is possible to efficiently mass-produce a rigid hollow structure whose sectional profile is virtually rectangular. For this reason, Al alloys are widely used for bumper reinforcements, bumper stays, door beams and so on.

However, a body energy absorber which consists of an Al alloy extruded hollow shape with a virtually rectangular sectional profile has the following problem: if it is used for rear bumper reinforcement, its bending strength may be insufficient with respect to the virtually horizontal force (of vehicle collision) applied to the body energy absorber when the body collides against a pole.

In order to prevent the body from being bent upon collision against a pole as mentioned above, the bending strength of the bumper reinforcement must be increased. There are various ways to increase it: increasing the strength of Al alloy itself as the material for the bumper reinforcement; increasing the thickness of web, front wall and/or rear wall; increasing the width of the bumper reinforcement and so on.

However, if the strength of the Al alloy shape is increased, it might be more difficult to make shapes by extrusion or bending and such shapes might be more likely to crack, resulting in less collision energy absorption. Also, an increase in the thickness of the Al alloy shape or the width of the bumper reinforcement will lead to an increase in weight, which means that the lightness of Al alloy is traded off for increased strength. If the thickness of the Al alloy shape should be simply increased, the maximum load (force) of a collapsing bumper reinforcement might be larger than the permissible maximum load for side members, and it would be very likely to damage body members such as front side members.

J-P-A-No. 286536/1994 discloses a reinforcement structure in which an auxiliary hollow shape reinforcement made of Al alloy (which has, for example, a semicircular sectional profile at the front and a planar one at the rear and incorporates two props or ribs) is glued to the longitudinal center of the bumper reinforcement front side.

If an auxiliary steel reinforcement as mentioned above is used, the auxiliary reinforcement weight to obtain a satisfactory reinforcing effect is added, which offsets the advantage of lightness offered by the use of Al alloy for an energy absorber.

The auxiliary reinforcement in the form of a hollow shape of Al alloy as described in the above-said J-P-A-No. 286536/1994 may be lighter than the above-said steel reinforcement. Yet still, because the weight of the hollow shape reinforcement with a closed sectional profile is added, the problem of weight increase remains in comparison with the case of absence of an auxiliary reinforcement.

According to the above-said gazette, it is possible to lighten the bumper reinforcement main body as an Al alloy hollow shape by using an auxiliary reinforcement and decreasing its wall thickness. However, the auxiliary reinforcement has a hollow structure with a closed sectional profile and uses inner ribs (props) to reinforce it, so the collapse strength of the auxiliary reinforcement is rather high. Therefore, if the wall thickness of the bumper reinforcement main body is decreased as stated above, upon collision against a pole or in a similar situation, the bumper reinforcement main body might collapse earlier than the auxiliary reinforcement.

Further, because the auxiliary reinforcement is a hollow shape with a closed sectional profile, it is virtually impossible to join it to the bumper reinforcement main body mechanically or using bolts or the like or by welding. Consequently, the fixing method which uses glue as described in the gazette is unavoidable. However, gluing is much more unreliable as a method for fixing a vehicle structural member than a mechanical fixing method or welding.

It is thus demanded that a car body energy absorber such as a rear bumper reinforcement should have a sufficient bending strength without its lightness being unfavorably affected and without a decline in energy absorption upon body collision against a pole, and never bend horizontally from its center or cause buckling upon such collision.

Usually, the bumper reinforcement is fixed to the car body through car body couplers such as bumper stays. In case of a bumper reinforcement which has a curved (or curved) portion at each end, the surface of the bumper stay to come into contact with the bumper reinforcement must match the curved surface of the latter in attaching the former to the latter. Even when the contact surfaces of both are matched, there still remains another problem: how they should be joined and fixed. One known approach as the prior art is that bolts are passed through both the hollow of the curved portion of the bumper reinforcement and that of the bumper stay to connect them with the top and bottom of the bolts staying in these hollows. A conventional technique for joining and fixing a bumper stay to a side member on the bumper stay's car body side is that a hollow attachment as an integral part of the bumper stay is provided and the stay is joined and fixed to the side member through the attachment. This attachment has a width that matches the width of the side member.

Then this hollow attachment is placed in position on the side member and engaged with it. Bolts are passed through this engagement horizontally from the side of the car body and the stay and side member are fixed with the top or bottom of the bolts staying in the hollow of the side member or attachment.

However, these conventional joining/fixing methods have drawbacks. First of all, they are impractical and sometimes even ineffective.

In the above-said conventional methods, it is practically difficult to put a bolt into the inside of the bumper reinforcement and stay which are both hollow and have a closed sectional profile. It is even more difficult for a bumper reinforcement with a curved portion at each end. It is also practically difficult to let the bolt's top and bottom stay in the hollows with the bolt passed through them as suggested by the conventional methods.

Further, it is unrealistic to join and fix the stay to the front of the side member according to the prior art for the following reasons. One reason is that it is difficult to position the above-said hollow attachment on the side member in the car body widthwise direction.

Besides, even if the hollow attachment is once positioned on and engaged with the side member, it is difficult to let the bolt's top or bottom stay in the hollow of the side member or stay attachment with the bolt passed through them horizontally from the side of the car body.

BRIEF SUMMARY OF THE INVENTION

A first object of this invention is to provide a car body energy absorber as a strengthened version of Al alloy car body energy absorber which does not damage the car body as it bends upon car body collision against a pole, where the lightness and high energy absorption performance are maintained.

According to this invention, a car body energy absorber which achieves this object consists of a hollow shape with a rectangular sectional profile and a reinforcing shape to be attached to the front face of the collision plane of the hollow shape. The reinforcing shape consists of the following: a collision wall which is almost parallel to the collision plane of the hollow shape; plural horizontal ribs attached to the collision wall which are parallel to each other; and vertical flanges protruding outward from the reinforcing shape, located at the tips of the horizontal ribs, opposite to the collision wall. The reinforcing shape is connected with the collision plane of the hollow shape through the vertical flanges.

The car body energy absorber according to this invention offers the following advantages. Firstly, since the hollow shape and the reinforcing shape are aluminum alloy extruded shapes, the overall weight of the absorber is smaller and the weight increase due to the addition of the reinforcing shape is also relatively small. Secondly, what is particularly important is that, since the reinforcing shape has not a hollow, closed rectangular sectional profile having four sides but an open sectional profile and, it is possible to increase the strength while maintaining the weight increase due to the addition of the reinforcing shape at the minimum level. Thirdly, it is easy to attach because the reinforcing shape is connected with the hollow shape's collision plane through the vertical flanges located at the tips of the horizontal ribs.

Furthermore, in the car body energy absorber according to this invention, the hollow shape may be larger (in height and width) than the conventional type of absorber with a rectangular sectional profile because it is reinforced by a center rib.

In addition, in the car body energy absorber according to this invention, the horizontal ribs and the vertical flanges are connected in a manner that their intersections each form a circular arc, or so that the horizontal ribs of the reinforcing shape bend inwards in the cross section of the shape when a force is applied almost horizontally. Thanks to this, the decrease in resistance to the applied force which may be caused by deformation, is smaller and the collision energy is more absorbed than when the horizontal ribs of the reinforcing shape bend outwards in the cross section.

Consequently, in case of a less significant collision with a relatively small force applied almost horizontally, it is likely that the hollow shape does not collapse and only the reinforcing shape collapses. This offers the advantage that only the reinforcing shape need be replaced in repair after the collision.

The car body energy absorber according to this invention uses one of AA or JIS 5000, 6000 and 7000 series of Al alloys. Since these Al alloys are excellent in formability and have a high strength, they are easily manufactured by extrusion and other techniques and can provide a higher collision energy absorbing power.

Because of these excellent characteristics, the car body energy absorber according to this invention is particularly suitable for use as a reinforcement for the vehicle rear bumper or front bumper.

A second object of this invention is to provide a stay as an Al alloy extruded shape which is easily attachable to the rear face of the curved portion of the bumper reinforcement end and the front face of the side member as well as a bumper reinforcement integrated with stays which is easily attachable to the side member.

In order to achieve this object, this invention provides a bumper stay to be attached to the car body side surface of each end portion of the bumper reinforcement, where the bumper stay consists of the following: a front wall whose shape matches the car body side surface of each end of said bumper reinforcement; at least two side walls which support said front wall from the car body side; and a rear wall connected with the side wall end opposite to said front wall. The rear wall and the side walls meet virtually at right angles. The front wall has flanges protruding outward from the bumper stay.

In a stay according to this invention, particularly when each end of the bumper reinforcement has a curved portion which is bent toward the rear of the car body, the front wall of the stay is shaped in a way to match the shape of the rear face of each end of the bumper reinforcement or so that it has an inclination to match the rear face of the curved portion. In addition, the stay is characterized in that its front wall has flanges protruding at both ends of the stay (or side walls).

Therefore, in comparison with the above-said conventional stay whose front wall has no flanges, this stay is easily attached because these flanges enable and facilitate mechanical connection with the rear face of each curved end of the bumper reinforcement by means of bolts and nuts or rivets. In other words, the introduction of these flanges makes it easy to join and fix the stay to the above-said car body side surface of each end of the bumper reinforcement, and also to the front face of the side member at its rear wall.

If an electrode can be put in the hollow of the above-said curved end of the bumper reinforcement or the like, the electrode can be easily attached to the flanges so it is possible and easy to use spot welding. It is also possible and easy to connect the stay with the bumper reinforcement by welding on the flange end and along the rear face of the curved portion to be in contact with this end. A combination of these connecting methods can be used, which means that various options with regard to the connecting method are available. This is one of the major advantages of the stay according to this invention.

In this respect, the flanges can be easily and mechanically joined and fixed to the rear face of each curved end of the bumper reinforcement, for example, by means of self-piercing rivets, bolts or something like that.

Also, by making holes in the flanges, the bumper stay can be easily and mechanically joined and fixed to the rear face of each curved end of the bumper reinforcement through these holes by means of bolts or something like that.

Also, the bumper stay can be joined and fixed to the rear face of each curved end of the bumper reinforcement by welding on the flanges.

The stay according to this invention has holes in its rear wall. Therefore, it can be easily joined and fixed to the front face of the side member through these holes by means of bolts or something like that.

Further, the stay according to this invention has working holes in the front wall excluding the flange areas. Therefore, even if the stay has a hollow structure with a closed sectional profile, the rear wall of the stay can be easily joined and fixed to the front face of the side member through these holes by means of bolts or something like that.

Further, the stay according to this invention has an open sectional profile with working holes in the front wall excluding the flange areas. Therefore, even if the stay has a hollow structure with a closed sectional profile, the rear wall of the stay can be easily joined and fixed to the front face of the side member through these holes by means of bolts or something like that.

The stay according this invention has a hollow sectional profile which is composed of a front wall, side walls and a rear wall as mentioned above, resulting in improvement in the collapse strength of the stay.

However, if the stay has a hollow, closed sectional profile, it would be difficult to attach it to the side member. To facilitate its connection with the side member, it is desirable to have an attachment for connection with the side member at the rear side of the rear wall.

The stay according to this invention is made of an Al alloy which is chosen from among AA or JIS 5000, 6000 and 7000 series Al alloys. These Al alloys are suitable for the stay according to this invention because they are excellent in formability, have a high strength and can thus be easily manufactured by extrusion or a similar technique.

In addition, the stay according to this invention may be pre-assembled on the bumper reinforcement to make up a bumper reinforcement integrated with stays. To install a conventional stay, the car manufacturer must take two steps: (1) attachment of the stays to the side members and (2) attachment of the stays to the bumper reinforcement. Contrary to this, the bumper reinforcement integrated with stays according to this invention only requires the car manufacturer to take step (1) or attachment of the stays to the side members, because the bumper reinforcement is pre-assembled with the stays.

Furthermore, it is most desirable to make up a bumper by combining the above-said bumper reinforcement as a car body energy absorber which achieves the first object of this invention and the above-said bumper stays which achieve the second object of the invention.

BRIEF DESCRIPTION OF THE DRAWINGS

Preferred embodiments of this invention will be described in detail based on the followings, wherein.

DETAILED DESCRIPTION OF THE PREFERRED EMBODIMENTS

Next, referring to the attached drawings, car body energy absorbers as preferred embodiments of this invention will be explained.

Figure 1A:
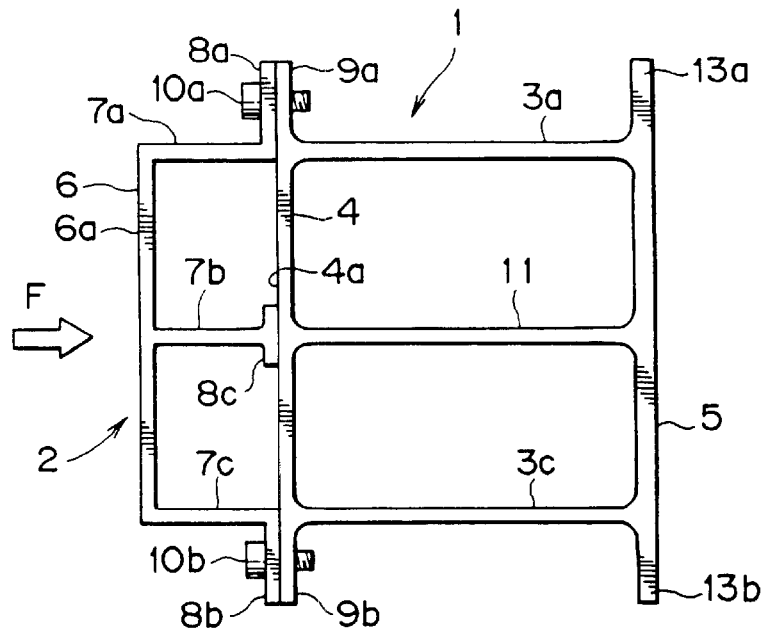
FIG. 1a is a sectional view showing a car body energy absorber according to one embodiment of this invention.
Figure 1B:
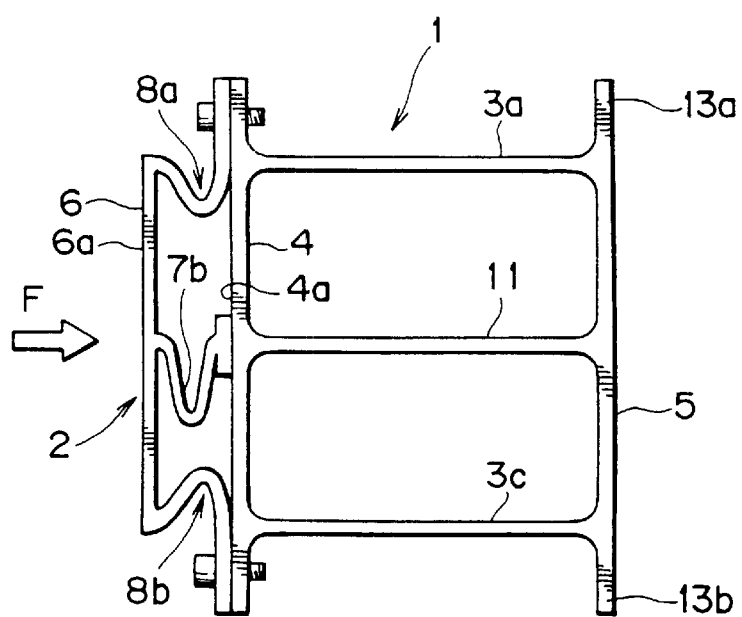
FIG. 1b is a sectional view showing a car body energy absorber of FIG. 1a bending inwards.
Figure 2:
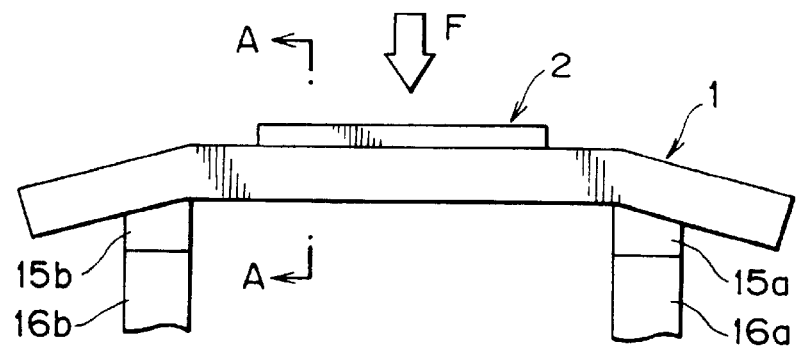
FIG. 2 is a plan showing the installation of the car body energy absorber according to this invention.

A bumper reinforcement according to one embodiment of this invention is illustrated in the sectional view of FIG. 1 (a cross section of A—A in FIG. 2, as viewed from the side of the car body) and in the top view of FIG. 2. As shown in these figures, the bumper reinforcement, which basically lies as an extension of the car body almost horizontally with respect to the car body, consists of an Al alloy hollow shape 1 with a rectangular sectional profile as a main energy absorber for the car body and a reinforcing shape 2 to be attached to the front of the collision plane 4a of the hollow shape.

The hollow shape 1 is a monolithic hollow structure whose sectional profile looks like vertically arranged two rectangles, where the front wall 4 constituting the collision plane 4a and the rear wall 5 are connected through two side walls (webs) 3a and 3c with an center rib 11 for reinforcement inside the hollow. This hollow shape 1 is an extruded shape made of Al alloy and the sectional profile of the monolithic hollow structure is the same over the length of the hollow shape 1 regardless of the structure of the center rib.

Also, the hollow shape 1 has flanges 9a, 9b and 13a, 13b (outwardly protruding portions of the hollow shape 1 at both ends) for attachment to the reinforcing shape 2 (described later) and to the car body, at each end of the front wall 4 and rear wall 5. It is possible that without these flanges 9a, 9b and 13a, 13b, the width (height) of the hollow shape 1 is increased and both ends of the front wall 4 and rear wall 5 are used for attachment to the reinforcing shape 2 and the car body. However, this method makes attachment of the reinforcing shape 2 to it and its attachment to the car body as mentioned later complicated. For this reason, it is more desirable to provide flanges 9a, 9b and 13a, 13b for the hollow shape 1.

Here, the cross section of the hollow shape 1 according to this invention may take the form of a single rectangle for the sake of lightness. However, if the outer dimension (height or width) of the hollow shape is to be increased, preferably a center rib for reinforcement should be installed inside the hollow in order to prevent weakening of the hollow shape or strengthen it.

In the hollow shape 1 as shown in FIG. 1, the front wall 4, rearwall 5 and two sidewalls 3a and 3b are linearly connected. Therefore, upon car body collision, force F is applied to the hollow shape from a virtually horizontal direction and goes along the orientation (horizontal) of the side walls 3a and 3c; as a consequence, usually the side walls deform and buckle outwards in the hollow cross section, starting from the point of bending, causing the hollow shape 1 to collapse or deform horizontally to absorb the energy of collision.

Figure 3:
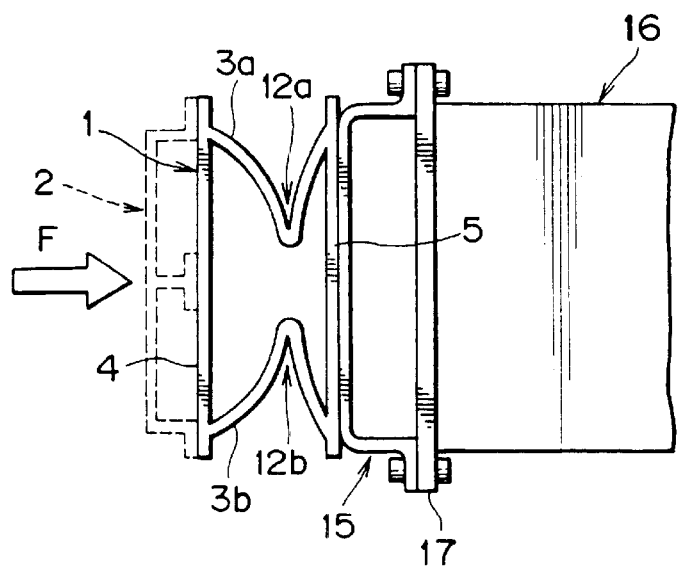
FIG. 3 is a sectional view illustrating a collision of the car body energy absorber according to this invention.

Alternatively, the connections of the two side walls 3a and 3c with the front wall 4 and rear wall 5 may be so designed that when force F from a virtually horizontal direction is applied to the hollow shape, the side walls 3a and 3c collapse as shown in FIG. 3 (cross section of A—A in the collapsing absorber) or collapse horizontally bending inwards in the hollow cross section (bends 12a and 12b). In this case, more collision energy will be absorbed than when the side walls 3a and 3c of the hollow shape bend outwards in the cross section as mentioned above.

For the side walls 3a and 3c of the hollow shape to bend inwards in its cross section to produce bends 12a and 12b as shown in FIG. 3, one possible method is to make the upper and lower corners of the side walls 3a and 3c (at which they join the front wall 4 and rear wall 5) form circular arcs facing inwards.

On the other hand, the Al alloy reinforcing shape 2, which is characteristic of this invention, has a hat-shaped sectional profile, basically composed of a collision wall 6, horizontal ribs 7a, 7b and 7c parallel to each other, and vertical flanges 8a, 8b and 8c.

The collision wall (vertical wall or vertical flange) 6, which is almost vertical, constitutes a collision wall plane 6a which is parallel to and in front of the collision plane 4a of the hollow shape 1. The horizontal ribs (side walls or horizontal walls) which support and reinforce this collision wall 6 from behind are virtually horizontal ribs 7a, 7b and 7c which are parallel to each other and connected with the collision wall 6 almost perpendicularly.

The vertical flanges 8a, 8b and 8c intersect with the tips of the horizontal ribs 7a, 7b and 7c at right angles. The flanges 8a and 8b, located at both sides of the reinforcing shape, protrude from the reinforcing shape outwards (vertically in the illustration of FIG. 1). These protruding vertical flanges 8a and 8b are in contact with the collision plane 4a of the hollow shape and joined to the collision plane 4a of the hollow shape with known fasteners 10a and 10b such as bolts. The (central) vertical flange 8c inside the reinforcing shape is optionally provided in connection with a horizontal rib which may be added, for the purpose of improving the connection with the collision plane 4a of the hollow shape.

The reinforcing shape 2 is an extruded shape made of Al alloy and has the same sectional profile over its length.

This Al alloy reinforcing shape 2 is specially designed to increase the bending strength of the central area of the length of the hollow shape 1 so that, particularly when the rear bumper reinforcement collides against a pole and a large force is applied to the hollow shape 1 from a virtually horizontal direction, the hollow shape 1 may not bend horizontally from its center.

This offers the following advantages. Firstly, since the reinforcing shape 2 has an open sectional profile, or a hat-shaped sectional profile, as mentioned above, the weight increase due to its weight is smaller than when it has a closed sectional profile, or a hollow rectangular sectional profile.

Secondly, since the plural horizontal ribs which are parallel to each other reinforce the collision wall 6, the reinforcing shape 2 itself is strengthened with minimized weight increase so as to function satisfactorily as a reinforcement. In other words, upon collision against a pole, force F applied to the reinforcing shape 2 (or the hollow shape 1) from a virtually horizontal direction causes the reinforcing shape 2 to collapse horizontally (deform horizontally) to absorb the collision energy, thereby protecting the hollow shape 1, located behind it, to increase the overall bending strength as a reinforcement.

Figure 4A:
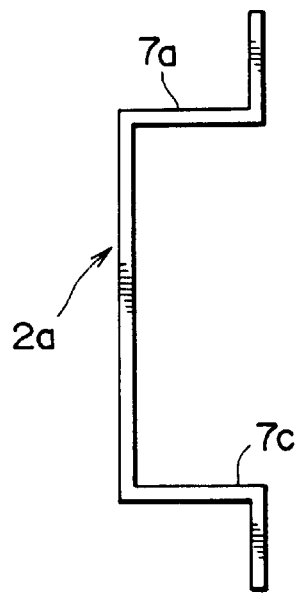
FIGS. 4A and 4B are sectional views showing reinforcing shapes as auxiliary car body energy absorbers according to other embodiments of this invention.
Figure 4B:
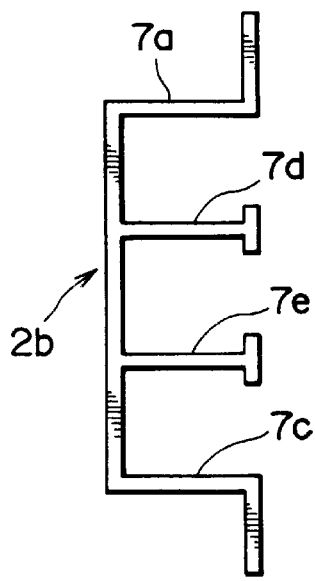

In the embodiment as illustrated in FIG. 1, there are three horizontal ribs (side walls). The number of horizontal ribs is not limited to 3. The horizontal ribs 7a and 7c at both ends are indispensable to reinforce the collision wall 6. The number of other inner horizontal ribs should depend on the degree of required reinforcement for the collision wall 6 or for the central area of the hollow shape 1. Such an inner rib should be optionally added and the number of such ribs may be any number from 1 to 4 unless such additional ribs lead to a significant weight increase. As seen from the sectional views of FIGS. 4A and 4B, the reinforcing shape may have only horizontal ribs 7a and 7c as shown in FIG. 4A, or may have horizontal ribs 7d and 7e in addition to them as shown in FIG. 4B.

The vertical flanges 8a, 8b and 8c, located at the tips of the horizontal ribs 7a, 7b and 7c of the Al alloy reinforcing shape 2, are designed to join it to the collision plane 4a of the hollow shape 1. While the introduction of the central vertical flange 8c is optional, the vertical flanges 8a and 8b at both ends (which are protruding outwards from both side of the reinforcing shape) are essential to ensure that the reinforcing shape 2 is joined to the hollow shape 1 mechanically or by welding with ease and reliability.

As shown in FIG. 1, the vertical flanges 8a and 8b at both ends can be easily joined to the flanges 9a and 9b of the hollow shape 1 by means of fasteners (bolts, etc) 10a and 10b. Electrodes can be placed on both the vertical flanges 8a, 8b and the flanges 9a, 9b of the hollow shape 1 so they can be joined by spot welding or a simple welding technique.

Without these vertical flanges 8a and 8b, it would be necessary to connect the reinforcing shape 2 and the hollow shape 1 using a rather complicated method such as the use of long bolts for connection between the collision wall 6 of the former and the front wall 4 of the latter. Thus, in order to join them by a simpler method, it would be necessary to rely on glue as in the method (described earlier) disclosed by J-P-A-No. 286536/1994, which would make the connection less reliable.

The reinforcing shape 2 may be long enough to cover the entire length of the front of the hollow shape. However, for the purpose of minimizing the weight increase caused by the addition of the reinforcing shape 2, it is unnecessary to make it so long as to cover the entire length of the front of the hollow shape; its length may be as desired provided that it is long enough to cover the area of the hollow shape front whose bending strength should be increased. The sample as shown in FIG. 2 is that the reinforcing shape covers only the central area of the length of the hollows shape 1 (which requires an increase in bending strength).

FIG. 2 shows a case that the hollow shape 1 provided with a reinforcing shape 2 according to this invention lies as an extension of the car body almost horizontally with respect to the car body, as a car body rear or front bumper reinforcement. The hollow shape 1 provided with the reinforcing shape 2 is connected with stays 15a and 15b by means of fasteners (at the flanges 13a and 13b as shown in FIG. 1) and connected with the car body side arms 16a and 16b through the stays 15a and 15b.

Although the hollow shape 1 shown in FIG. 2 is linear in its central area and curved at both ends to suit the car body shape (design), the invention is not so limited. Whether the entire length of the hollow shape should be linear or it should be curved in whole or part should be decided depending on the shape or structure of the car body or bumper.

Figure 5A:
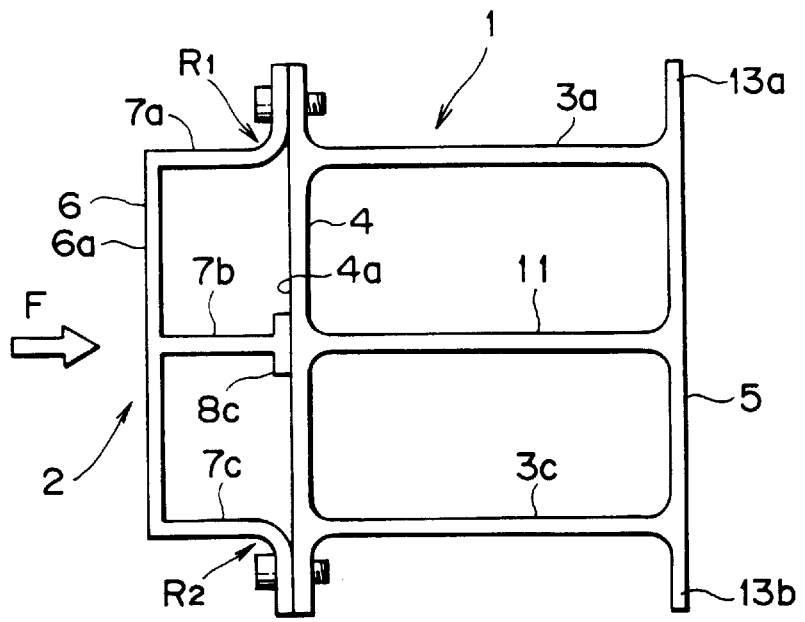
FIGS. 5A and 5Bb are sectional views showing other forms of car body energy absorbers according to this invention.
Figure 5B:
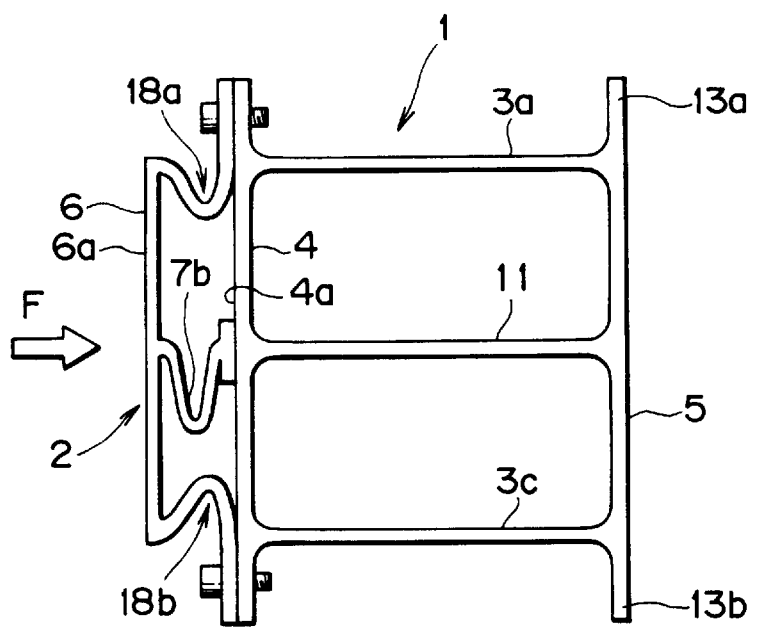

FIGS. 5A and 5B (sectional profiles similar to that shown in FIG. 1) illustrate other forms of Al alloy reinforcements as embodiments of this invention which have the same basic structure as shown in FIG. 1, except that the corners where the horizontal ribs 7a and 7c at both ends meet the vertical flanges (8a and 8b) are not orthogonal as shown in FIG. 1 but curved inward in the cross section like arcs with bends R1 and R2, respectively, as shown in FIG. 5A.

If the intersections of the horizontal ribs and vertical flanges are curved like arcs in this way, as force F applied from a virtually horizontal direction causes the horizontal ribs 7a and 7c of the reinforcing shape 2 to collapse horizontally, the horizontal ribs 7a and 7c will bend inwards in the cross section with the arc-like bends R1 and R2 as pivotal points.

Thanks to this structure, the reinforcing shape 2 absorbs more energy than when the horizontal ribs 7a and 7c bend outwards in the cross section. As a result, though it depends on the force F applied from a virtually horizontal direction, in case of a minor collision with a small force F, only the reinforcing shape 2 will collapse without collapse of the hollow shape 1 because of the high energy absorption performance of the reinforcing shape 2, as illustrated in FIG. 5B. This means that, because in case of a minor collision with a relatively small force F applied from a virtually horizontal direction, the reinforcing shape collapses but the hollow shape does not, only the reinforcing shape has to be replaced in repair after the collision.

(Applicable Al Alloys)

Next, an explanation of the Al alloy used in this invention will be given. The Al alloy which is used as the material for the hollow shape with a rectangular sectional profile and the reinforcing shape is chosen from among AA or JIS 5000, 6000 and 7000 series Al alloys that are widely used for structural members of this kind. These Al alloys are of the general-purpose (standard) type with a relatively high durability. Particularly, 7000 series (Al—Zn—Mg) Al alloys and 6000 series (Al—Mg—Si) Al alloys as tempered by T5 or T6 heat treatment are most suitable in terms of strength, corrosion resistance and workability. In T5 treatment, 7000 series Al alloy or 6000 series Al alloy is extruded, then subjected to an artificial aging process. In T6 treatment, such Al alloy is extruded, subjected to solution treatment, then to an artificial aging process (including overaging).

Even when one of the special Al alloys whose composition and constitution are controlled in various ways as proposed by material manufacturers is used, if this invention is applied to it, it will demonstrate a higher strength and a better energy absorption performance. The invention will be embodied at lower cost if a conventional general-purpose (standard) Al alloy is used. Of course, such a special Al alloy can be used for the purpose of this invention.

(Manufacture of Al Alloy Shapes)

Al alloy shapes like a hollow shape with a rectangular sectional profile and a reinforcing shape according to this invention can be manufactured as appropriate by a conventional method whose main process includes steps such as casting, homogenization heat treatment, hot extrusion and tempering. By using an extrusion technique to make shapes in this way, even a shape with a complicated sectional profile like the ones proposed by this invention can be manufactured easily and efficiently.

EMBODIMENT 1

Next, embodiments of the present invention will be described. A car body rear bumper reinforcement that has a structure as shown in FIG. 1 is assumed as an embodiment sample 1. To realize it, a hollow shape 1 with a rectangular sectional profile and a reinforcing shape 2, both as made of T5-treated JIS 6NO1 Al alloy (proof stress 240N/mm$^2$) by extrusion, were prepared.

T5-treated JIS 6NO1 Al alloy is widely used as a material for absorbing car body energies and, if a collision force is applied, is more likely to crack than JIS 7000 series Al alloys such as JIS 7003 Al alloy. Therefore, if the extruded shapes made of JIS 6NO1 Al alloy prove effective as intended by this embodiment, the result may be reflected in extruded shapes made of 7000 series Al alloy such as 7003 Al alloy.

For the purpose of comparison, sample 2, which consists of only a hollow shape 1 or does not comprise a reinforcing shape 2, was prepared. Also, a bumper reinforcement, which consists of an extruded shape made of T5-treated JIS 6NO1 Al alloy (proof stress 240N/mm$^2$), the same material as used for embodiment sample 1, and has a structure of closed rectangular sectional shape with a center rib, was prepared as sample 3. In sample 3 for comparison, the thicknesses of various parts are so designed as to ensure a bending strength equivalent to that of sample 1.

The hollow shapes 1 in sample 1 (embodiment) and sample 2 (for comparison) were made to the following specifications. The hollow shapes should be linear and have an overall length of 1200 mm. The front and rear walls should be 100 mm long (including the length of each flange, 15 mm) and have a wall thickness of 3.0 mm; the side walls 3a and 3c should be 70 mm long and they (including the center rib) have a wall thickness of 2.0 mm with the distance between the center rib and each side wall 32 mm.

The reinforcing shape 2 in sample 1 was made to the following specifications. The reinforcing shape 2 should be 400 mm long and its center should be aligned with the center of the hollow shape 1. According to the specifications, it was joined to the hollow shape through flanges by means of bolts as shown in FIG. 1. The collision wall 6 should have a thickness of 3.0 mm and the horizontal ribs 7a, 7c and vertical flanges 8a, 8b and 8c should have a thickness of 2.0 mm while the horizontal rib 7b should have a thickness of 2.5 mm; the collision wall 6 should be 70 mm long, the vertical flanges 15 mm long, the horizontal ribs 7a, 7b, and 7c 25 mm long and the distance between horizontal ribs 32 mm.

The hollow shape in sample 3 for comparison was made to the following specifications: 100 mm in length and 4.5 mm in wall thickness for the front wall and rear wall; 95 mm in length and 2.5 mm in wall thickness for the side walls 103 including the center rib.

A pole collision test was conducted on the embodiment sample and the samples for comparison. Analysis based on the Finite Element Method (FEM) was carried out to measure the amount of deformation of the central area of each hollow shape and evaluate the bending strength of the central area of the hollow shape as a rear bumper reinforcement. In this test, FEM analysis was made with respect to weights of the embodiment and comparison samples. Table 1 shows the result of the analysis in which the weight increase for the embodiment sample is expressed in percentage with respect to the weight increase for the comparison sample 2 as 100%.

A pole collision test was carried out under the following conditions: the front central area of each of the embodiment and comparison samples, or bumper reinforcements, which were arranged almost horizontally and assembled as mentioned above, was forced to collide against a steel pole (with a diameter of 175 mm) at the velocity of 2.2 m/sec (8 km/hr) so that an almost horizontal impact was applied to its front central area As can be understood from Table 1, in order to achieve an equivalent bending strength, embodiment sample 1 necessitates far less weight increase than sample 3 even though the reinforcing shape is added.

In embodiment sample 1, weight increase is less than sample 2 and the amount of deformation of the hollow shape central area is far smaller. This means that sample 1 is higher in bending strength than sample 2.

Therefore, this embodiment sample 1 is excellent in pole collision strength as stated above.

TABLE 1

| Sample | Hollow shape central deformation (mm) | Weight increase (%) |
|---|---|---|
| Sample 1 (embodiment) | 31 | 114 |
| Sample 2 (for comparison) | 65 | 100 |
| Sample 3 (for comparison) | 31 | 162 |

The above result demonstrates that the car body energy absorber according to this invention provides a high bending strength as a bumper reinforcement and an excellent pole collision strength without impairing the lightness. What is indicated by this result is true to other types of car body energy absorbers such as door beams, brackets and frames.

Next, bumper stays as preferred embodiments of this invention will be explained by reference to the drawings. Bumper stays are illustrated as 15a and 15b in FIG. 2.

Figure 6A:
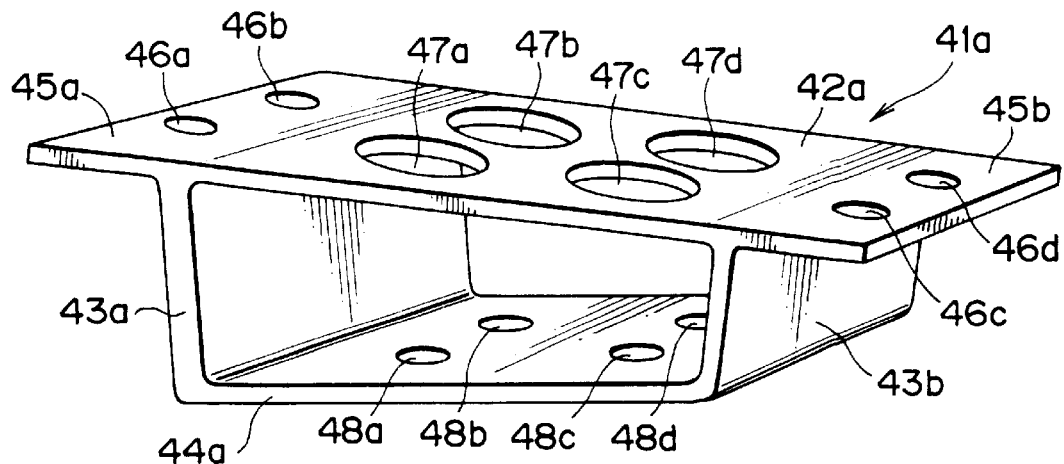
FIGS. 6A and 6B are a perspective view and a top view, respectively, showing a bumper stay according to one embodiment of this invention.
Figure 6B:
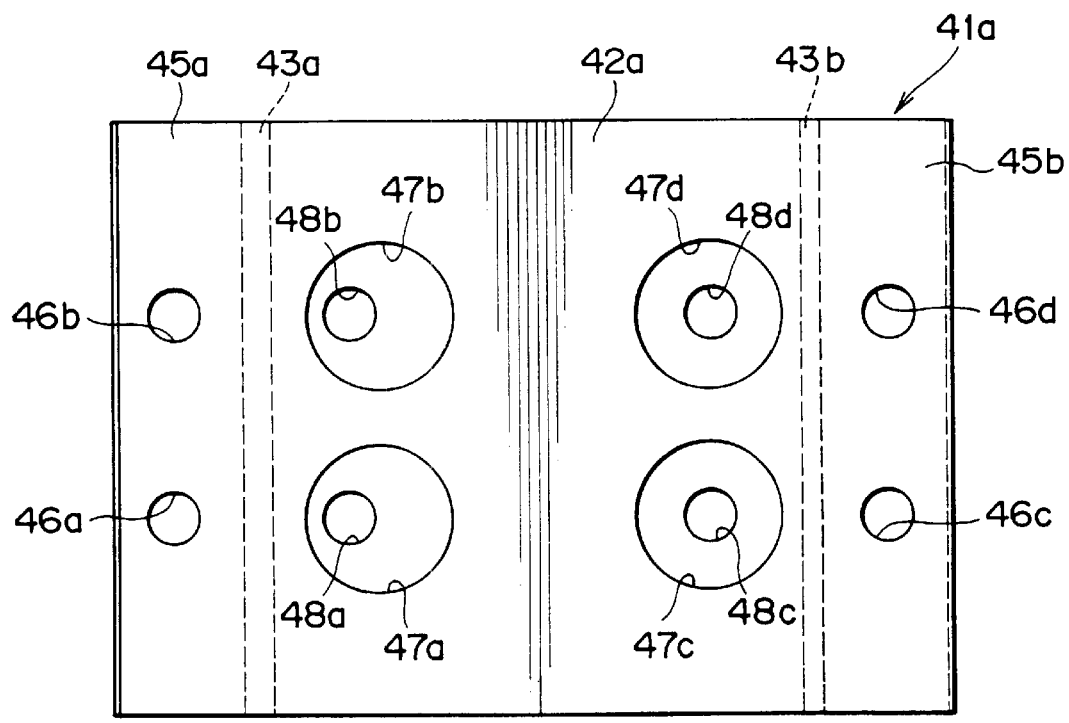

An embodiment of this invention for a stay and a bumper reinforcement with stays is illustrated in FIG. 6A, a perspective view, and FIG. 6B, a top view. In these figures, a stay 41a according to this invention is basically composed of the following: a front wall 42a which has an inclination matched to the shape of the curved end rear face of the bumper reinforcement; at least two sidewalls 43a and 43b which supports the front wall 42a from behind; and a rear wall 44a which is almost perpendicular to the side walls 43a and 43b. It has a hollow sectional profile which is composed of these walls.

The explanation of embodiments given below assumes that the bumper reinforcement is curved at its ends. If the bumper reinforcement is linear and has no curved ends, the front wall of the stay should be horizontal or linear to match the shape of the rear face of the bumper reinforcement ends.

Also, the explanation of embodiment given below assumes that the bumper reinforcement has a rectangular sectional profile. A center rib may be provided inside it for the purpose of reinforcement depending on the bumper reinforcement cross section size (height), which is determined by the car body design, and the required strength and collision energy absorption.

The front wall 42a has flanges 45a and 45b which protrude at both ends of the stay 41a (or of side walls 43a and 43b) almost horizontally and are inclined at the same angle as the front wall 42a to match the rear face of the above-said curved ends. These flanges do not necessarily need to protrude at both ends of the stay 41a as shown in FIG. 6A. Depending on the requirements and conditions for connection with the rear face of the above-said curved ends, or depending on where and how tightly they should be joined together, either flange 45a or flange 45b may be provided instead of both, in a way that the stay 41a has one flange protruding at one end of it.

Regarding the stay front wall inclination, the invention is not limited to the linear inclination as shown in FIG. 6A. The inclination may have the shape of an arc or stairs to suit the shape of the curved end rear face of the bumper reinforcement to which it is to be joined.

The side walls 43a and 43b are not parallel to each other; instead they are angled in a way that the cross section is tapered towards the rear of the car body. In other words, the side walls 43a and 43b are not precisely perpendicular to the front wall 42a and rear wall 44a, but roughly perpendicular to them or are inclined with respect to them at given angles. of course, it is also acceptable that the side walls 43a and 43b are parallel to each other and perpendicular to the front wall 42a and rear wall 44a. However, as described later, preferably the side walls should be slightly angled to facilitate the stay's connection with the curved end rear face of the bumper reinforcement.

The stay shown here is to be joined to the right-hand end of the bumper reinforcement as mentioned later and shown in FIG. 7. For the stay to be joined to its left-hand end, the structure is basically the same, except that the front wall 42a is inclined in the opposite direction. In short, they are symmetrical to each other.

As mentioned later and shown in FIG. 7, the stay according to this invention is joined and fixed to the rear face of one curved end of the bumper reinforcement through these flanges 45a and 45b and to the side member through the rear wall.

Since the flanges 45a and 45b are protruding sideward (outward) from the stay body and the side walls 43a and 43b are angled in a way that the cross section is tapered toward the car body rear, connection with the curved end rear face of the bumper reinforcement can be easily made with no interference or restriction by the stay body.

The flanges 45a and 45b can be easily joined and fixed to the curved end rear face of the bumper reinforcement, for example by driving in self-piercing rivets or the like from the back of the flanges 45a and 45b. As described later, they may also be mechanically joined and fixed with ease by making holes in them (and curved end rear face) and putting bolts through them.

Also the flanges 45a and 45b can be joined and fixed to the curved end rear face by welding on their surfaces of contact with the curved end rear face at their ends. If an electrode can be placed inside the hollow of the curved end of the bumper reinforcement, the spot welding method can be used because it is easy to install an electrode on a planar flange.

How to join and fix the stay to the bumper reinforcement will be explained concretely below, referring to FIGS. 6A and 6B and FIG. 7. FIG. 7 is a partially sectional top view illustrating how the stays are joined to the bumper reinforcement ends and side members.

As shown in FIGS. 6A and 6B, the stay flanges 45a and 45b have each two holes 46a and 46b, and 46c and 46d, respectively, to join and fix them to the bumper reinforcement (curved end rear walls), and these holes are spaced with a given distance. These holes are not needed if the fixing method which uses self-piercing rivets or welding is adopted.

As can be seen from FIG. 7, the stay flange 45a or 45b is joined and fixed to the curved end rear wall 57a or 57b of the bumper reinforcement as follows. Fasteners such as bolts 50a and 50b or 50c and 50d (four fasteners for each stay in this case) are first passed through working holes 53a and 53b, or 53c and 53d in the front wall 56a or 56b of the bumper reinforcement curved end 49a or 49b and then into holes 46a and 46b or 46c and 46d in the flange 45a or 45b, or in the reverse order, so that they pierce through the holes 46a and 46b or 46c and 46d and holes 55a and 55b or 55c and 55d in the curved end rear wall 57a or 57b. Then, the bolts are tightened with nuts as shown to firmly join the bumper reinforcement and stays to integrate them into an assembly.

This bumper reinforcement integrated with stays can be easily joined and fixed to the side members by inserting bolts from the side of the bumper reinforcement with stays or the side members. This procedure will be detailed below by reference to FIG. 7.

As shown in FIGS. 6A and 6B, the front wall area excluding the flanges (front wall central area) 42a of the stay 41a optionally have four holes for connection with the side member, 47a, 47b, 47c and 47d (which form mutually parallel two rows with each row consisting of two spaced holes). In the rear wall 44a of the stay 41a, optionally there are four holes for connection with the side member, 48a, 48b, 48c and 48d (which also form mutually parallel two rows with each row consisting of two spaced holes), corresponding to the four holes in the front wall.

Figure 7:
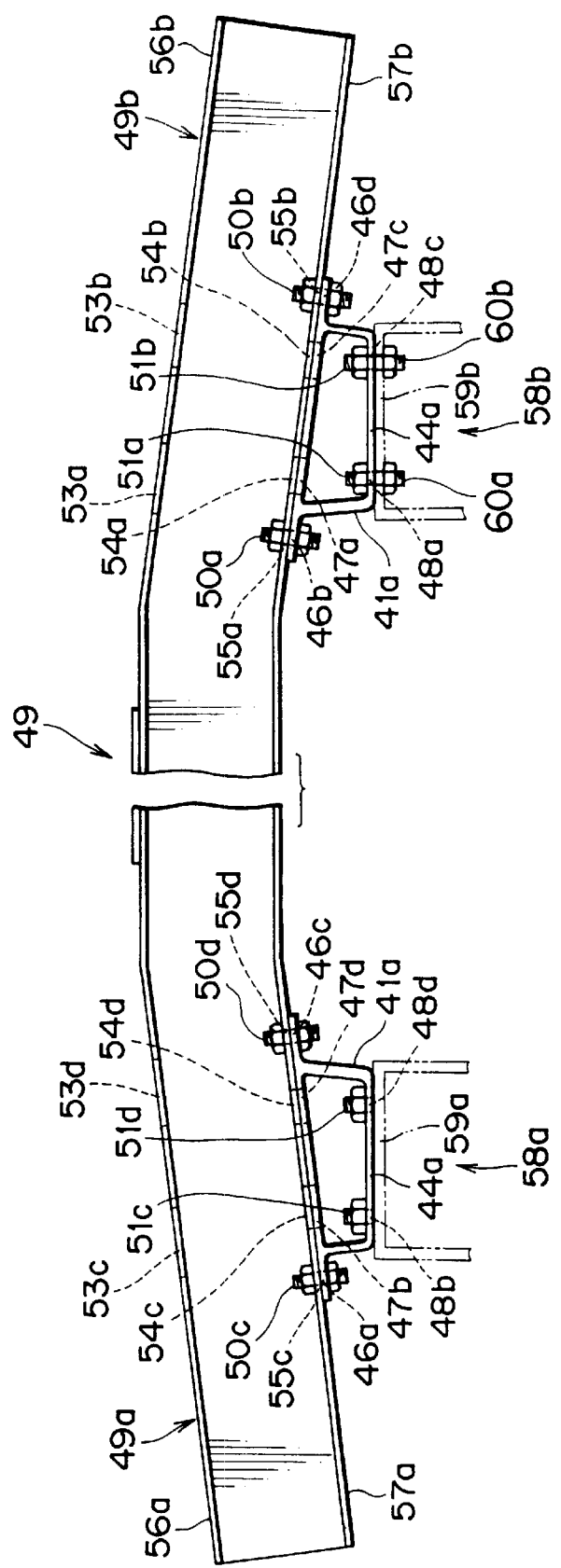
FIG. 7 is a partially sectional top view showing the attachment of the bumper stays shown in FIG. 6 to the ends of the bumper reinforcement.

A concrete illustration of the method for joining the bumper reinforcement integrated with stays to the side members is given in FIG. 7. For the convenience of illustration, FIG. 7 shows both the method of attaching a stay to the side member for the left-hand end 49a of the bumper reinforcement 49 and that for its right-hand end 49b, which are slightly different as mentioned later. The method of attachment may be different or the same between the left-hand end 49a and the right-hand end 49b of the bumper reinforcement 49.

On the right-hand curved end 49b of the bumper reinforcement 49 in FIG. 7, fasteners such as bolts 51a and 51b (four bolts in this case) are inserted through the working holes 53a and 53b in the front wall 56b, toward the rear of the bumper reinforcement.

Then these bolts 51a and 51b are passed through the holes 54a and 54b in the bumper reinforcement rear wall 57b, holes 47a and 47c in the front wall of the stay 41a, holes 48a and 48c in the rear wall 44a of the stay 41a, and holes 60a and 60b in the front wall 59a of the side member 58b, respectively. Then, as shown here, the bolts are tightened with nuts or the like to put together the side member 58b and the bumper reinforcement 49 with stay 41a.

The above-mentioned attachment steps can be easily carried out through the working holes 53a and 53b in the front wall 56b of the left-hand curved end 49b of the bumper reinforcement 49.

On the left in FIG. 7, fasteners such as bolts 51c and 51d (four fasteners in this case) are pre-inserted or embedded with their bottoms oriented forward. Then these bolts 51c and 51d are passed through holes 48b and 48d in the rear wall 44a of the stay 41a, and holes 54c and 54d in the bumper reinforcement rear wall 57a. Then, as shown, the bolts are tightened with nuts or the like to put together the side member 58a and the bumper reinforcement 49 with stay 41a.

The above-mentioned steps can be easily carried out through the working holes 53c and 53d in the front wall 56a of the left-hand curved end 49a of the bumper reinforcement 49.

Figure 8:
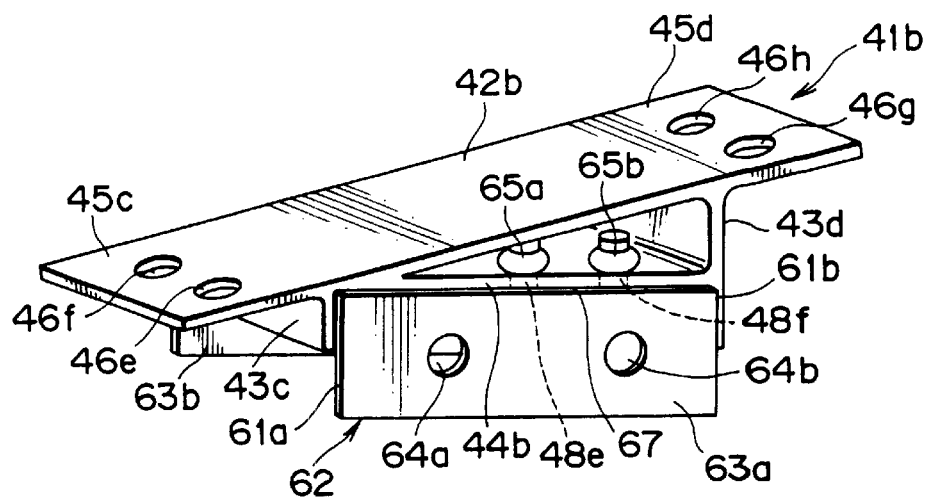
FIG. 8 is a perspective view showing another form of bumper stay according to this invention.
Figure 9:
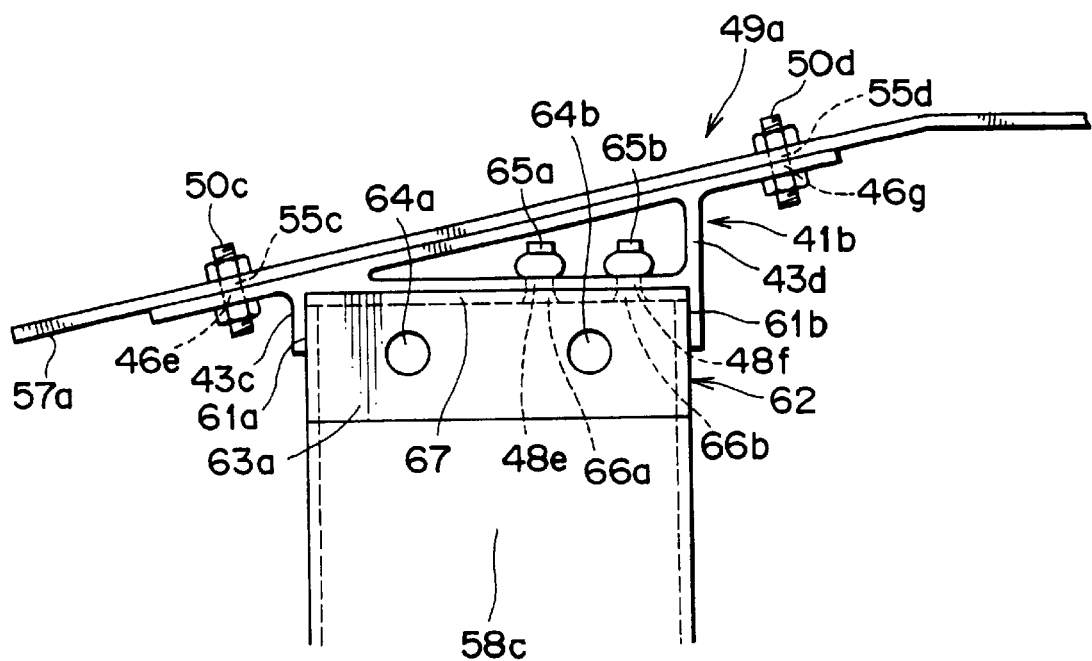
FIG. 9 is a partially sectional top view showing the attachment of the bumper stay shown in FIG. 8 to one end of the bumper reinforcement.

As another embodiment of this invention is illustrated in FIG. 8, a perspective view and FIG. 9, a partially sectional top view. In FIG. 8, like the stay 41a in FIG. 6, a stay 41b is composed of the following: a front wall 42b which has an inclination matched to the shape of the curved end rear face of the bumper reinforcement; at least two side walls 43c and 43d which support the front wall 42b from behind; and a rear wall 44b which is almost perpendicular to the side walls 43c and 43d. Basically it has a hollow sectional profile, which is composed of these walls. The front wall 42b has flanges 45c and 45d which are protruding from the side walls 43c and 43d and inclined so as to match the curved end rear face.

The rear wall 44b of the stay 41b has four holes 46e and 46f for fixing the side member attachment 62 (which form mutually parallel two rows of holes with each row consisting of two spaced holes, though only two holes are visible in the figure).

The structural differences from the stay 41a in FIG. 6 are as follows. First, unlike the hollow closed sectional profile of the stay 41a, the sectional profile of the stay 41b is such that the rear wall 44b crosses not only the side wall 43c but also the front wall 42b to form a triangular hollow sectional profile. Due to this structure, the side wall 43c also functions as an attachment piece 61a.

Figure 11:
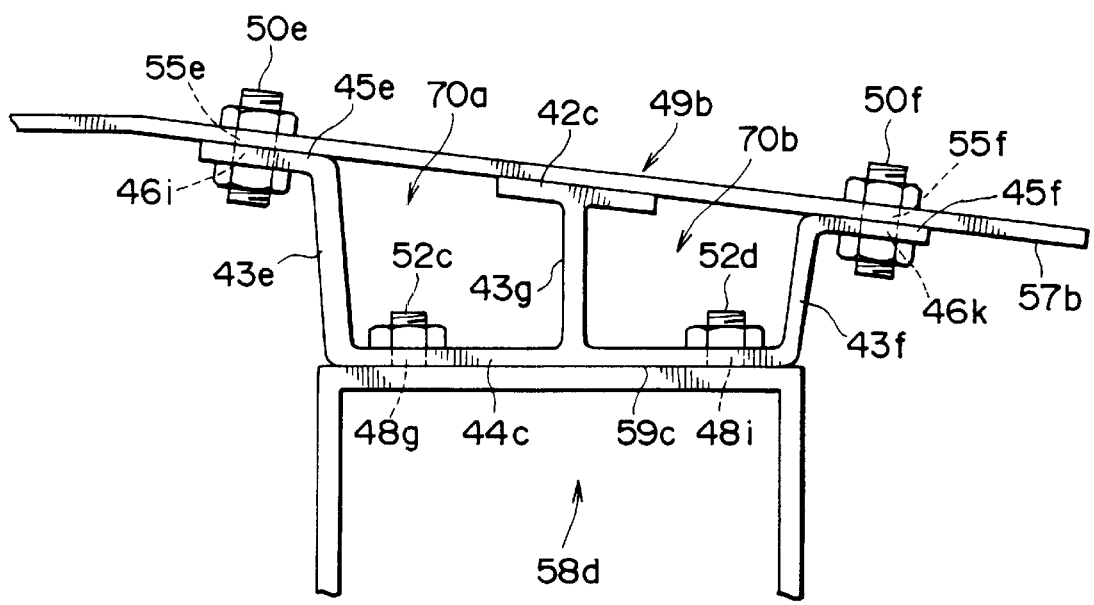
FIG. 11 is a partially sectional top view showing the attachment of the bumper stay shown in FIG. 10 to one end of the bumper reinforcement.

Another difference from the stay 41a in FIG. 6 is that there are attachment pieces 61a and 61b for fixing the side member attachment 62 as extensions of the side walls 43c and 43d on the backward side of the rear wall 44b. The attachment 62 has the shape of a flattened U and its middle (horizontal) wall 67 is fixed to the rear wall 44b of the stay 41b as illustrated in FIG. 11. Its side (vertical) walls 63a and 63b, parallel to each other, have a total of four attachment holes 64a and 64b (two for the attachment piece 61a and two for the opposite attachment piece 61b, which form two parallel rows, though only the former two are shown here).

This stay is to be attached on the left-hand end of the bumper reinforcement as described later referring to FIG. 9. For the stay to be attached on its right-hand end, the structure is basically the same, except that the front wall 42a is inclined in the opposite direction. In short, they are symmetrical to each other.

Like the flanges 45a and 45b in FIG. 6, the flanges 45c and 45d of the stay 41b are joined and fixed to the rear face 57a of the left-hand curved end 49a of the bumper reinforcement to put together the bumper reinforcement and stay. Then, the bumper reinforcement integrated with the stay is joined and fixed to the front face of the side member 58c.

Even in the case of the stay 41b in FIG. 8, the presence of the flanges 45c and 45d makes it possible and easy to join it to the rear face of the curved end of the bumper reinforcement as in the case of the stay 41a in FIG. 6.

The concrete method for joining and fixing the flanges 45c and 45d of the stay 41b in FIG. 8 to the rear face 57a of the left-hand curved end 49a of the bumper reinforcement is the same as in the case shown in FIGS. 6 and 7, and explained below referring to FIG. 9.

In FIG. 9, the flanges 45c and 45d of the stay 41b have each two holes 46e and 46f, and 46g and 46h, respectively, to join and fix them to the rear face 57a of the bumper reinforcement left-hand curved end 49a, and these holes are spaced with a given distance.

Fasteners 50c and 50d such as bolts (four fasteners in total in this case) are inserted from the working holes (not shown) in the front wall of the bumper reinforcement left-hand curved end 49a or from the rear face of the flanges 45c and 45d and passed through the holes 46e and 46f in the flange 45c, and 46g and 46h in the flange 45d and then the holes 55c and 55d (there are two other holes opposite to the holes 55c and 55d; thus four holes in total); then, the bolts are tightened with nuts as shown to put together the bumper reinforcement and stay.

The procedure for joining the bumper reinforcement integrated with the stay 41b to the side member 58c will be detailed below by reference to FIG. 9.

First, the stay 41b and attachment 62 are joined and fixed by driving in rivets 65a and 65b from the rear face of the horizontal wall of the U-shaped attachment 62 (from below). This may be accomplished by using self-piercing rivets or welding.

Then, in order to join the stay 41b to the side member 58c, align the holes 64a and 64b (the holes shown here are for the attachment piece 63a; there are also two holes for the attachment piece 63b opposite to it, where these holes form mutually parallel two rows with each row consisting of two spaced holes) in the parallel walls 63a and 63b (attachment pieces) of the U-shaped attachment 62 with the corresponding holes (not shown) in the side member end. Fasteners such as bolts are inserted through these holes and tightened with nuts on the side member (not shown here).

Figure 10:
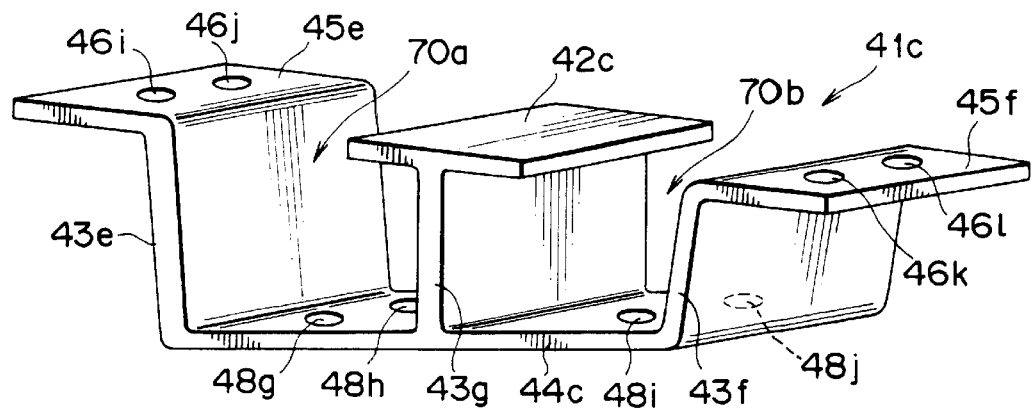
FIG. 10 is a perspective view showing another form of bumper stay according to this invention.

A stay and a bumper reinforcement with stays as embodiments of this invention are illustrated in FIG. 10, a perspective view and FIG. 11, a partially sectional top view.

A noticeable difference between the stay 41c in FIG. 10 and the stays shown in FIGS. 6 through 8 is that while the latter's sectional profile is closed and hollow, the former has openings 70a and 70b in the front wall 42c (excluding the flanges), which are not covered by the front wall, or it has an open sectional profile. Therefore, the stay 41c has one sidewall (center rib) 43g which supports the front wall 2c located in the center and between two openings, from behind.

These openings 70a and 70b facilitate attachment of the stay 41c to the side member, like the working holes 47a, 47b, 47c and 47d in the front wall of the stay 41a shown in FIGS. 8A and 8B.

Unlike the stays shown in FIGS. 6 through 8, the thickness of the inner side wall 43e is larger than that of the outer side wall 43f. The reason is that, since the bumper reinforcement is curved at both ends and the stay 41c has an open sectional profile with openings 70a and 70b, a larger collision force may be applied from the front to the inner side wall 43e than to the outer side wall and thus the former should be more durable than the latter. Whether the two side walls have the same thickness or not should be decided depending on the possible collision force applied from the front.

The other structural parts of the stay are almost the same as those of the stays shown in FIGS. 6 through 8. It is composed of the following: a front wall 42c which has an inclination matched to the shape of the curved end rear face of the bumper reinforcement; at least two side walls 43e and 43f which support the front wall 42c from behind; and a rear wall 44b which is almost perpendicular to the side walls 43e and 43f; and a rear wall 44c which is almost perpendicular to the side walls 43e and 43f. Basically it has a hollow and open sectional profile is which is composed of these walls.

The front wall 42c has flanges 45e and 45f which are protruding from the side walls 43e and 43f and inclined so as to match the shape of the curved end rear face of the bumper reinforcement. The flanges 45e and 45f have each two spaced holes for attachment to the curved end rear face: holes 46i and 46j for the flange 45e and 46k and 46l for the flange 45f.

In the rear wall 44c of the stay 41c, there are holes for attachment to the front face of the side member: 48g and 48h for the opening 70a, and 48i and 48j for the opening 70b.

The structure of the stay is designed to match the right-hand end of the bumper reinforcement as illustrated in FIG. 11 and described later. For the stay to be joined to its left-hand end, the structure is basically the same, except that the front wall 42c is inclined in the opposite direction. In short, they are symmetrical to each other.

As seen from FIG. 11, like the stays in FIGS. 6 through 8, the flanges 45e and 45f are joined and fixed to the rear face 57b of the right-hand curved end 49b of the bumper reinforcement to make a bumper reinforcement integrated with stays. The rear wall 44c of the stay 41c is joined and fixed to the front face of the side member 58c.

The procedure for joining the stay 41c to the rear face 57b of the right-hand curved end 49b of the bumper reinforcement as shown in FIG. 11 is basically the same as shown in FIGS. 7 and 9. In short, bolts 50e and 50f (four bolts in total in this case) are respectively passed through the holes 46i and 46j, and 46k and 46l in the flanges 45e and 45f and through the holes 55e and 55f in the curved end rear face 57b of the bumper reinforcement; then, the bolts are tightened with nuts as shown to put together the bumper reinforcement and stay.

The procedure for attachment of the stay 41c to the side member 58d is the same as the one illustrated in FIG. 7. For example, as in the procedure for the left-hand stay (FIG. 7), fasteners 52c and 52d such as bolts are placed as oriented forward (two fasteners in this case) on the front wall 59c of the side member 58d and these fasteners 52c and 52d are passed through the holes 48g and 48i in the rear wall of the stay 41c and tightened with nuts as shown. For attachment of the stay 41c to the side member 58d, it is also possible to use the procedure for the right-hand stay as illustrated in FIG. 7.

As can be understood from the above explanation, since the stay 41c shown in FIG. 10 has openings 70a and 70b in the front wall 42c excluding the flanges and thus has an open sectional profile, it is easy to join it to the side member 58d.

Figure 12:
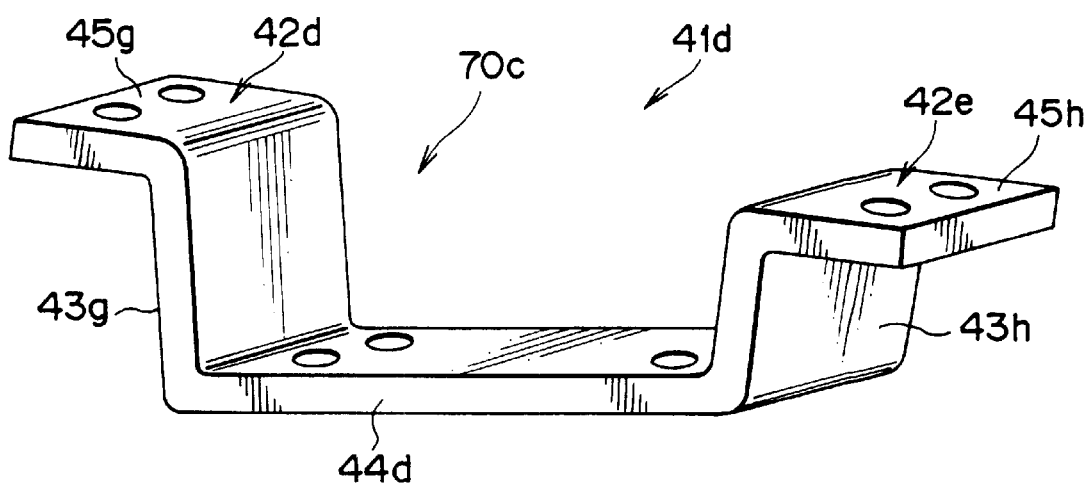
FIG. 12 is a perspective view showing another form of bumper stay according to this invention.
Figure 13:
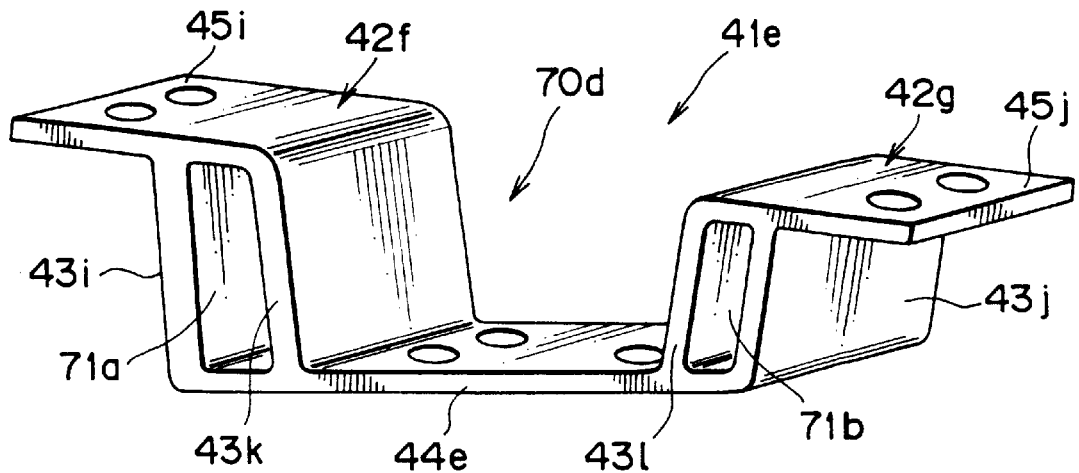
FIG. 13 is a perspective view showing another form of bumper stay according to this invention.

A stay with an open sectional profile may be in other forms such as those shown in the perspective views of FIGS. 12 and 13. The stay 41d shown in FIG. 12 is different from the one shown in FIG. 10 in that it does not have such a center side wall 43g supporting the center front wall 42c that the latter has; in other words, it has one opening 70c or a hat-shaped sectional profile. The insufficiency of strength due to the absence of the center front wall and side wall is compensated for by the thickened flanges 45g, 45h, side walls 43g, 43h and rear wall 44d.

The stay 41e in FIG. 13 has dual side walls instead of thickened walls as in the case of the stay 41d in FIG. 12. The stay 41e in FIG. 13 is structurally the same as the stay 41d in FIG. 12 in that it has an opening 70d and does not have such a center side wall 43g supporting the center front wall 42c that the stay in FIG. 10 has, and its sectional profile is hat-shaped and open. The difference from the stay 41d is that there are additional inner side walls 43k and 43l on the inner side of the side walls 43i and 43j to make dual side walls with hollows 71a and 71b, respectively, to compensate for the insufficiency of the strength due to the absence of the center front wall and side wall.

The Al alloys and the production process for Al alloy shapes for the bumper stays according to this invention is the same as that for the energy absorbers as mentioned earlier.

An energy absorber according to this invention can be combined with conventional bumper stays to make up a bumper assembly. Or, bumper stays according to this invention can be combined with a conventional energy absorber to make up a bumper assembly. However, a combination of an energy absorber and bumper stays according to this invention is more desirable. It is recommended that bumper stays according to this invention be used as bumper stays 15a and 15b shown in FIG. 2.

What is claimed is:

1. A car body energy absorber, comprising:
    a hollow shape with a rectangular sectional profile;
    a reinforcing shape attached to a front of a collision plane of said hollow shape, wherein said reinforcing shape comprises,
        a collision wall which is almost parallel to the collision plane of said hollow shape;
        at least one inner horizontal rib which is attached to said collision wall;
        a plurality of mutually parallel end horizontal ribs which are each attached to opposite ends of said collision wall; and
        vertical flanges located at the tips of said end horizontal ribs, opposite to said collision wall, protruding outwards from said reinforcing shape, said reinforcing shape joined to the collision plane of said hollow shape through the vertical flanges.

2. The car body energy absorber as defined in claim 1, wherein said hollow shape has a center rib.

3. The car body energy absorber as defined in claim 1, wherein said end horizontal ribs are designed to bend towards the inside of said reinforcing shape when a force is applied from a virtually perpendicular direction to the collision plane of said hollow shape.

4. The car body energy absorber as defined in claim 1, wherein each of the intersections of said end horizontal ribs and said vertical flanges forms an arc.

5. The car body energy absorber as defined in claim 1, wherein said hollow shape and said reinforcing shape are made of aluminum alloy.

6. The car body energy absorber as defined in claim 5, wherein the aluminum alloy is one of AA or JIS 5000, 6000 or 7000 series aluminum alloys.

7. A bumper reinforcement, comprising:
    a hollow shape with a rectangular sectional profile;
    a reinforcing shape attached to a front of a collision plane of said hollow shape, wherein said reinforcing shape comprises,
        a collision wall which is almost parallel to the collision plane of said hollow shape;
        a plurality of mutually parallel horizontal ribs which are attached to said collision wall; and
        vertical flanges located at the tips of said horizontal ribs, opposite to said collision wall, protruding outwards from said reinforcing shape, said reinforcing shape joined to the collision plane of said hollow shape through the vertical flanges.

8. The bumper reinforcement as defined in claim 7, wherein said hollow shape includes a center rib.

9. The bumper reinforcement as defined in claim 7, wherein said horizontal ribs comprises a plurality of end horizontal ribs each attached to opposite ends of said collision wall, said end horizontal ribs bend towards the inside of said reinforcing shape when a force is applied from a virtually perpendicular direction to the collision plane of said hollow shape.

10. The bumper reinforcement as defined in claim 7, wherein said horizontal ribs comprises a plurality of end horizontal ribs each attached to opposite ends of said collision wall, wherein the intersection of said end horizontal ribs and said vertical flanges forms an arc.

11. The bumper reinforcement as defined in claim 7, wherein said hollow shape and said reinforcing shape are made of aluminum alloy.

12. The bumper reinforcement as defined in claim 11, wherein the aluminum alloy is one of AA or JIS 5000, 6000 or 7000 series aluminum alloys.

* * * * *